Patented Sept. 19, 1944

2,358,356

UNITED STATES PATENT OFFICE 2,358,356

RIBOFLAVIN DERIVATIVES AND PROCESS FOR THEIR PREPARATION

Gustav A. Stein, Plainfield, and William J. Moran, Jr., Cranford, N. J., assignors to Merck & Co., Inc., Rahway, N. J., a corporation of New Jersey No Drawing. Application August 20, 1942, Serial No. 455,546

17 Claims. (Cl. 260—211)

This invention relates to novel organic chemical compounds and to methods of preparing the same. Specifically, it is concerned with derivatives of the growth-promoting factor riboflavin and to processes for synthesizing said derivatives.

The riboflavin derivatives according to the present invention are obtained by reacting riboflavin or an alkali metal salt of riboflavin such as sodium riboflavin, with a polybasic organic carboxylic acid such as phthalic acid, succinic acid and anhydrides of said acids. These compounds, particularly the succinate have solubility properties which facilitate their administration and also possess the advantage over other materials, such as sodium riboflavin, that they form aqueous solutions having about the same hydrogen ion concentration (pH about 8) as is present in the human blood stream, thus making them suitable for injection administration.

The following examples illustrate methods of carrying out the present invention, but it is to be understood that these examples are given by way of illustration and not of limitation.

Example 1

About .001 mol. of sodium riboflavin is refluxed for approximately 14 hours in about 250 cc. of anhydrous pyridine with about .002 mol. of succinic anhydride. After evaporation of the pyridine, the residue is dissolved in water and acidified with 10% phosphoric acid. The crystals which separate are removed and recrystallized twice from boiling water. The orange-red amorphous substance so obtained decomposes at 218–220° C.

Example 2

About .001 mol. of riboflavin is refluxed for approximately 14 hours in about 250 cc. of anhydrous pyridine with .002 mol. of succinic anhydride. After evaporation of the pyridine the residue is acidified with 10% phosphoric acid and the amorphous insoluble material is removed and twice recrystallized from boiling water. After drying the deep orange residue decomposes at 218–219 uncorrected.

Modifications may be made in carrying out the present invention without departing from the spirit and scope thereof and the invention is to be limited only by the appended claims.

What is claimed is:

1. A condensation product of a substance selected from the class consisting of riboflavin and alkali metal salts of riboflavin with a substance selected from the group consisting of phthalic acid anhydride and succinic acid anhydride.

2. A condensation product of a substance selected from the class consisting of riboflavin and alkali metal salts of riboflavin with succinic acid anhydride.

3. A condensation product of sodium riboflavin and succinic acid anhydride.

4. The process that comprises condensing a substance selected from the class consisting of riboflavin and alkali metal salts of riboflavin with a substance selected from the class consisting of phthalic anhydride and succinic anhydride.

5. The process that comprises condensing a substance selected from the class consisting of riboflavin and alkali metal salts of riboflavin with succinic anhydride.

6. The process that comprises condensing riboflavin with succinic acid anhydride.

7. The process that comprises condensing sodium riboflavin with succinic acid anhydride.

8. The process that comprises condensing a substance selected from the class consisting of riboflavin and alkali metal salts of riboflavin with a substance selected from the class consisting of phthalic anhydride and succinic anhydride in the presence of a substantially inert solvent.

9. The process that comprises condensing a substance selected from the class consisting of riboflavin and alkali metal salts of riboflavin with succinic anhydride in the presence of a substantially inert solvent.

10. The process that comprises condensing riboflavin with succinic acid anhydried in the presence of a substantially inert solvent.

11. The process that comprises condensing sodium riboflavin with succinic acid anhydride in the presence of a substantially inert solvent.

12. The process that comprises reacting a substance selected from the class consisting of riboflavin and alkali metal salts of riboflavin with a substance selected from the class consisting of phthalic anhydride and succinic anhydride in the presence of a substantially inert solvent at an elevated temperature.

13. The process that comprises reacting a substance selected from the class consisting of riboflavin and alkali metal salts of riboflavin with succinic anhydride in the presence of a substantially inert solvent at an elevated temperature.

14. The process that comprises reacting riboflavin with succinic acid anhydride in the presence of a substantially inert solvent at an elevated temperature.

15. The process that comprises reacting sodium riboflavin with succinic acid anhydride in the presence of a substantially inert solvent at an elevated temperature.

16. The process that comprises refluxing a mixture or riboflavin and succinic anhydride in pyridine.

17. The process that comprises refluxing a mixture of sodium riboflavin and succinic anhydride in pyridine.

GUSTAV A. STEIN.
WILLIAM J. MORAN, Jr.